United States Patent
Delmage

[11] 3,727,970
[45] Apr. 17, 1973

[54] CAMPING ASSEMBLIES

[76] Inventor: Norman E. Delmage, 22 Birchcliffe Avenue, Kitchener, Canada

[22] Filed: Feb. 17, 1971

[21] Appl. No.: 116,103

[52] U.S. Cl. ................................. 296/23 R, 296/69
[51] Int. Cl. ............................................. B60p 3/38
[58] Field of Search ..................... 296/23 R, 66, 69, 296/24, 28

[56] References Cited

UNITED STATES PATENTS

| | | | |
|---|---|---|---|
| 3,254,914 | 6/1966 | Steck | 296/28 R |
| 2,587,871 | 3/1952 | May | 296/23 R |
| 3,476,432 | 11/1969 | Aliment | 296/69 |

*Primary Examiner*—Philip Goodman
*Attorney*—Cecil C. Kent

[57] ABSTRACT

A camping assembly the parts of which are rapidly connectible and disconnectible for particular use in automobile vans is secured to a van deck via a set of laterally related longitudinals supported on edge by transverse connecting members over which lie a set of panels capable of constituting sleeping accomodation when the occupants lie transverse to the van axis, or seating with provision for a table, by lifting two adjacent pairs of hingedly connected panels such that the center pair assumes the sub-vertical thus providing two opposite seat-backs while the outer pair function as seats, all extending transversely over the van axis, with space for a table between two panels when one is slid into said seat position, storage accommodation existing between said longitudinals and connecting members.

6 Claims, 6 Drawing Figures

PATENTED APR 17 1973 3,727,970

*Inventor*
Norman E. Delmage

*By*
Cecil C. Kent
*Attorney*

CAMPING ASSEMBLIES

THE GENERAL CHARACTER OF THE INVENTION

The present invention relates to a camping assembly of conspicuously simple construction, capable of manufacture with inconsiderable outlay for tooling, which can be fabricated for shipment by semi-skilled or unskilled labor, which is capable of being assembled and taken apart as to the components thereof easily and without skill or undue effort, all to the end that an erected structure may be rigidly secured to a van deck (or on the ground outside the van) which will function as sleeping accommodation for several people lying transverse to the van axis with substantial accommodation for storage beneath them, or, alternatively, may be converted into extra seating extending transversely to the van axis with provision for a table on which for instance the ingredients of a picnic can be prepared, or upon which children in transit can play.

DESCRIPTION OF THE PRIOR ART

Camper vans are well known and are made by Dodge, Ford, Chevrolet and Volkswagen, perhaps others. All these are particularly characterized by the roofs thereof some of which as in the case of the Dodge Family Wagon and the Ford MiniHome are rigid, while the roofs of the Chevrolet Travel Cruiser and Volkswagen Camp-mobile are movable, all for the purpose in one way or another of providing additional headroom.

The disadvantage of such vans is that they are primarily for camping purposes — are designed as such and, regardless of whatever other use they are put to, are recognizable as such. Such limitations of course prevent many people who would like to enjoy camping with the advantage of a van for doing so, are unable to do so due to the cost of buying one particularly and more or less exclusively for this purpose.

ADVANTAGES OF THE PRESENT INVENTION

The inventive idea which the structure herein set forth embodies to overcome the difficulties, inconveniences and limitations set forth in the last preceding paragraph resides in the fact that a standard van may be employed — a van which in the first instance can be purchased for a smaller outlay when new or used than the vans described above, and can also be sold or traded with less depreciation. As a consequence large numbers of people of limited means can enjoy the advantages of van camping. There is greater storage capability because the roof is not interfered with and consequently can be utilized. The entire interior of the van being unobstructed may be utilized for the installation of the present invention as a result of which more people may perhaps be accommodated at least for sleeping.

In addition to the foregoing, the assembly set forth herein can be assembled and used anywhere there is space to accommodate the same. For example in a spare room, recreation room, cottage patio or tent in which places it can serve as a bed, a dinette, a games table, sewing center, patio table or desk and thus, for many owners constitute a year-round utility.

With the considerations and inventive objects herein set forth in view, and such other or further purposes, advantages or novel features as may become apparent from consideration of this disclosure and specification, the present invention consists of the inventive concept which is comprised, embodied, embraced, or included in any method, process, construction, composition, arrangement or combination of parts, or new use of any of the foregoing which may, herein be exemplified in one or more specific embodiments of such concept, reference being had to the accompanying drawings in which:

FIG. 3 is a fragmentary perspective detail depicting the means for removably securing the assembly to the deck of a van.

In the drawings like characters of reference designate similar parts in the several Figures.

SUMMARY DESCRIPTION

Figure 1:
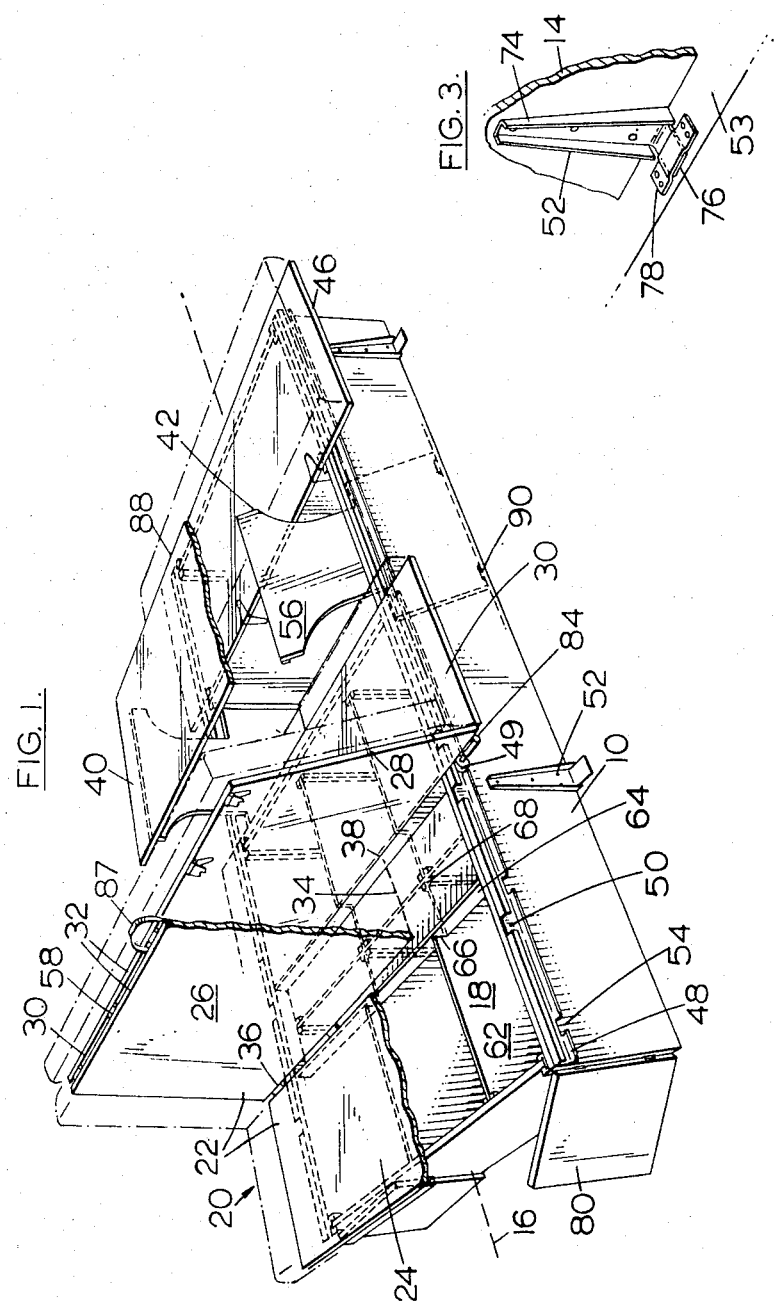
FIG. 1 is a fragmented perspective representation of the invention shown in seating condition and depicting the table at its location of choice.

To identify and import consonance between the language used in this specification between the disclosure and the claims thereof in describing and defining the parts of the invention and their relationship, the said invention is a camping assembly wherein the improvement comprises the adaptation and design of its components for rapid connection and disconnection in automotive vans, and, in combination, of a set of laterally spaced longitudinally and horizontally extending supporting means 10, longitudinally spaced transversely extending connecting means 12 spanning supporting means 10 at right angles and connected thereto, and user bearings panel means 14 at least predominantly supported over said supporting means, the plane of at least one of said panel means being horizontal.

More specifically the said supporting means 10 are parallel with the longitudinal horizontal van axis 16, said supporting means being considerably elongated relative to the width thereof and lying on edge.

More specifically connecting means 12 span supporting means 10 and provide with supporting means 10 compartments 18 bounded by said connecting and supporting means.

More specifically panel means 14 include seating means 20 formed of at least two pairs of next adjacent panels 22, the panels 24 and 26, and 28 and 30 of each pair respectively being edge-connected at 32, elongated relative to their widths, with their major axes parallel and at right angles to supporting means 10, the opposite end panels 24 and 30 of said two pairs being supported on supporting means 10, means for maintaining the next adjacent panels 26 and 28 of each of said pairs in co-planar horizontal position, or in acute angular position, and means for maintaining the vertex edges 32 of panels 26 and 28 in propinquity when they are in the acute relative angular position shown in FIG. 1, said panels when in such angular position forming a prism together with the horizontal area 34 between their base edges 36 and 38, said horizontal area being arbitrarly indicated by the phantom line 34, said next adjacent panels 26 and 28 when in said acute relative angular (prismatic) position constituting opposed seat backs with the opposite end panels 24 and 30 constituting seats.

More specifically stated the invention includes a table 40 elevated above the plane of the user bearing means 14, means 42 for maintaining the table 40 so elevated, the seat back 28 and the table 40 being spaced apart by approximately the width of the accommodation needed to seat a user at the table with the back of the user against the seat back 28.

More specifically stated the invention includes user bearing means 14 which are in the form of a set of relatively elongated and narrow transversely horizontally disposed panels and in which one of said opposite end panels, namely the end panel 24 constitutes a seat at one end of the invented assembly.

More specifically the invention includes that both endmost panels 24 and 46 constitute seats, the endmost panel 46 being the panel which is next adjacent table 40.

More specifically the invention includes roller track means 48 extending in the vicinity of the upper margin of the supporting means 10, roller means 49 secured to said user bearing panel means 14 for reducing friction between said supporting and bearing panel means upon movement of the latter upon the former, and means 50 for facilitating the insertion and detachment into and from said roller track means 48 of roller means 49, and means 52 for removably securing said assembly to the deck 53 of the van and means 54 for preventing unwanted movement of the user bearing panel means upon said supporting means 10.

More specifically table 40 includes means in the form of a pair of leg panels 56 hingedly connected at the lower edges thereof to supporting means 10 for rotation between the horizontal and the vertical between said supporting means 10, the vertex edges 32 being hingedly connected as at 58.

DETAILED DESCRIPTION

It will be apparent that the present assembly when the members thereof are connected is of generally elongated configuration, wood being generally the material of choice. The supporting means 10 consists of a lateral marginal pair 60. Intermediate longitudinals 62 are provided in spaced relationship with those designated 60. A transversely extending tray 64 is supported on 62 which are recessed as at 66 for the purpose. The vertical ends of the longitudinals 62 are receivable within pairs of vertical and spaced slats 68 secured to means 12. The vertical ends of means 12 may be T-flanged as at 70 to be received within a pair of spaced rebate strips 72 secured to the inner surfaces of the means 10 as best illustrated in FIG. 4.

The means 10 are secured to deck 52 via means 50 which takes the form of a set of angle brackets 74 secured to means 10, said angle brackets each including the outwardly projecting footpiece 76 intended to be secured under the floor clips 78. At the ends of each of the members 60 hinged extension wings 80 are provided rotatable between the positions shown in FIG. 1 and the position shown in FIG. 2. Optionally the said wings need only be connected to one end of the assembly.

Figure 4:
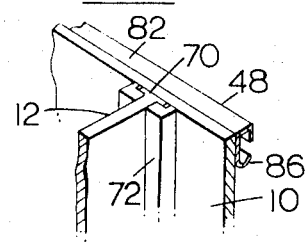
FIG. 4 is a fragmentary perspective detail depicting the manner in which the transverse connector means are connected to the longitudinal supporting means.

The roller track means 48 desirably consist of an aluminum extrusion of the configuration best shown in FIG. 4 from which it will be seen that the same is of generally channel formation. At intervals upon the length thereof means 50 in the form of recesses are formed upon the upper flange 82 thereof to facilitate the insertion and detachment into and from the track means of the roller means 49. Such roller means simply consist of free-running rollers journalled upon stub shafts 84 connected to and spaced from the underside outer marginal areas of the panels forming the user bearing panel means 14. The means 54 to be seen formed in the transversely arcuate under flange 86 of 48 constitute drop-sockets into which the rollers of means 49 may fall to be prevented from free horizontal movement thus stabilizing the user supporting bearing panel means 14 until shifted by reasonable manual effort.

Figure 2:
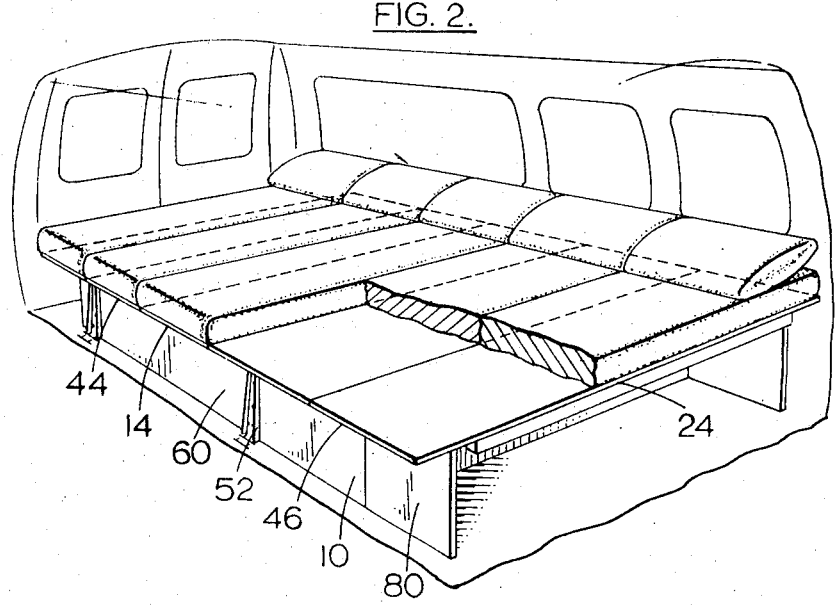
FIG. 2 is a perspective representation of the invented assembly shown with the entire user supporting panel means in horizontal condition for use of the whole assembly as sleeping accommodation and occupying the position it would occupy within an automobile van.
Figure 6:
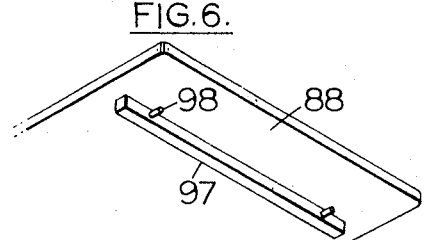
FIG. 6 is a fragmentary underside perspective representation of one end of the horizontal panel of the table depicting the means by which the leg panels connect thereto.
Figure 5:
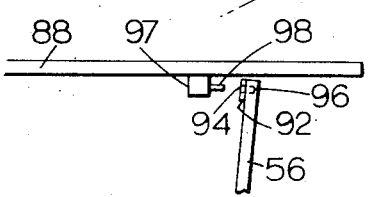
FIG. 5 is a fragmentary side elevation depicting the manner in which the leg panels are connected to the horizontal panel of the table.

A central lifting strap 87 or a pair of the same nearer to the lateral edges of the assembly may be positioned where the panels 26 and 28 are edge connected namely at 30 from co-planar horizontal position as in FIG. 2 to the seat position of FIG. 1. Details of the manner in which the table panel 88 is rigidly connected to the leg panels 56 are best to be seen by reference to the accompanying FIGS. 5 and 6. From these Figures it will be understood that each leg panel when in the vertical is in interfacing contact with the inner surface of the laterals 60, the configuration of panels 56 being clearly discernable from FIG. 1 and which Figure also shows said panels to be hinged along the bottom edges thereof to the inside bottom edges of the laterals at 90. It follows that any pressure tending to force the upper portions of panels 56 apart from each other laterally of the assembly will be an inwardly biassing pressure. The upper inner edge of each of the panels 56 is faced with a steel strip 92 provided with a pair of apertures 94. These apertures are aligned with the pair of blind apertures 96 which project into the panels 56 themselves. Secured to the underside surface of table panel 88 are two strips 96 from each of which project outwardly, in opposition the dowels 98. The dowels are designed to enter the apertures 94 and 96. Obviously upon the dowels and apertures at one end of the table being socketed, a slight outward pressure (to the right with respect to FIG. 5) upon the upper end of the shown panel 56 will cause it to yield against resistance and upon being released snap against the strip 97 with the dowels entering. As a result a very rigid table set up is achieved.

The table panel 88 may be stored conveniently within the confines of the laterals 60 when not in use. When converted to bed formation, it will also be understood that the panel 30 will be slid to the right with respect to FIG. 1 to occupy the gap left by the table. The extension wings 80 will be rotated into co-planarity with the laterals 60. Hence panel 24 will be supported thereon.

Various modifications may be constructed or performed within the scope of the inventive concept disclosed. Therefore what has been set forth is intended to describe and/or illustrate such concept and is not for the purpose of limiting protection to any herein particularly described embodiment thereof.

What is claimed is:

1. A camping assembly wherein the improvement comprises (i) the adaptation and design of its parts for lying, sitting and storage use with rapid connection and disconnection of its parts in automobile vans, and (ii) the combination of user bearing panel means and laterally spaced longitudinally and horizontally extending panel-supporting means below said panel means, longitudinally spaced transversally extending connecting means spanning said supporting means at right angles and connected thereto, said panel means embodying a plurality of panels at least predominantly supported upon said supporting means, at least two adjacent said panels being disposable in co-planar horizontal arrangement upon said supporting means, said panel means including seating means formed of at least two pairs of next adjacent panels the panels of each pair being hingedly edge-connected, elongated relative to the width thereof, with their major axes parallel and at right angles to said supporting means, the opposite end panels of said two pairs being supported on said bearing means, means for maintaining the next adjacent panels of each of said pairs in co-planar horizontal position, or in acute relative angular position, and means for maintaining the vertex edges of said next adjacent panels in propinquity they are in acute relative angular position, said panels when in acute relative angular position forming a prism together with the horizontal area between their base edges, and when in acute relative angular prismatic position constituting opposed adjacent seat backs with said opposite end panels constituting seats.

2. The invention according to claim 1 in which said user bearing means include at least one panel convertible into a seat back by rotation from the horizontal into at least the sub-vertical, means for maintaining said panel in seat back position, and a table elevated above the plane of said user bearing means, means for maintaining said table so elevated, said seat back and said table being spaced apart by approximately the width of the accommodation needed to seat a user at said table with the back of said user against said seat back.

3. The invention according to claim 2 in which endmost panels of said user bearing means constitute seats the endmost panel at one end being the next panel adjacent said table.

4. The invention according to claim 1 in which said user bearing means are in the form of a set of relatively elongated and narrow transverse horizontally disposed panels, said supporting means being parallel, with the longitudinal horizontal van axis, considerably elongated relative to the width thereof, lying upon edge and substantially determining the lateral extent of said assembly, roller track means extending in the vicinity of the upper margin of said supporting means, roller means secured to said user bearing panel means for reducing friction between said supporting means and said user bearing panel means upon movement of the latter upon the former, and means for facilitating the insertion and detachment into and from said roller track means of said roller means and means for (i) removably securing said assembly to the deck of said van, and (ii) means for preventing unwanted independent movement of said user bearing panel means upon said supporting means.

5. The invention according to claim 4 in which both endmost panels of said user bearing means constitute seats, which includes a table having a horizontal panel elevated above the plane of said user bearing means, means for maintaining said horizontal panel so elevated, said table including horizontal panel carrying means, said carrying means being in the form of a pair of leg panels hingedly connected at the lower edges thereof to said supporting means for rotation between the horizontal and the vertical between said supporting means, the endmost panel at one end of said user bearing means being the next panel adjacent said table, the vertex edges of said next adjacent panels of each of said pairs of next adjacent panels being hingedly connected.

6. A camping assembly wherein the improvement comprises (i) the adaptation and design of its parts for lying, sitting and storage use with rapid connection and disconnection of its parts in automobile vans, and (ii) the combination of user bearing panel means and laterally spaced longitudinally and horizontally extending panel-supporting means below said panel means, longitudinally spaced transversally extending connecting means spanning said supporting means at right angles and connected thereto, said panel means embodying a plurality of panels at least predominantly supported upon said supporting means, at least two adjacent said panels being disposable in co-planar horizontal arrangement upon said supporting means, said user bearing means including at least one panel convertible into a seat back by rotation from the horizontal into at least the sub-vertical, means for maintaining said panel in seat back position, and a table elevated above the plane of said user bearing means, means for maintaining said table so elevated, said seat back and said table being spaced apart by approximately the width of the accommodation needed to seat a user at said table with the back of said user against said seat back.

* * * * *